Patented Aug. 18, 1942

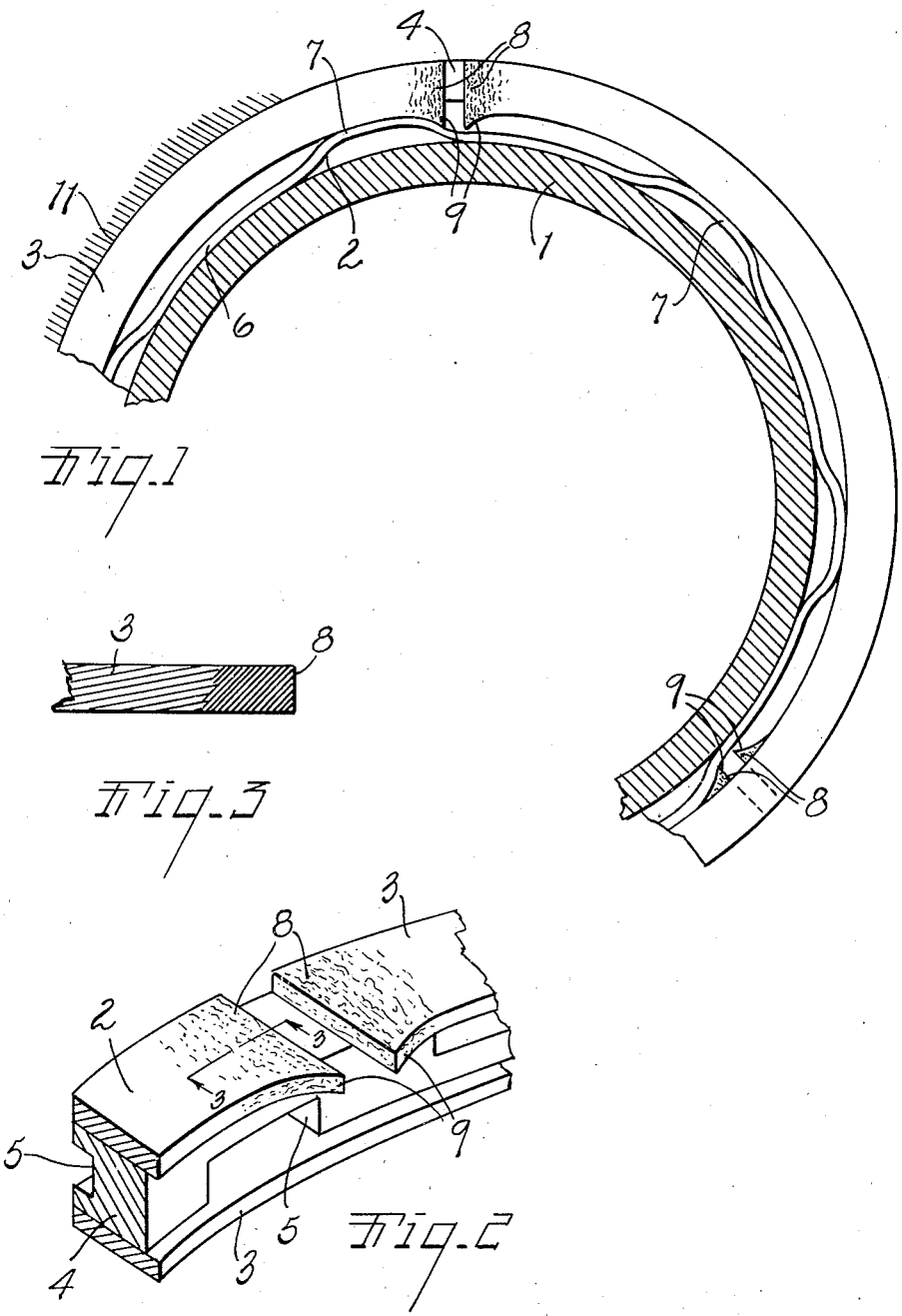

2,293,626

UNITED STATES PATENT OFFICE 2,293,626

PISTON RING

Harold P. Phillips, Hastings, Mich., assignor to Hastings Manufacturing Company, Hastings, Mich.

Application July 5, 1941, Serial No. 401,283

3 Claims. (Cl. 309—44)

The main objects of my invention are:

First, to provide an improved, multi-part piston ring assembly and means of novel character for securing certain of said parts in predetermined angularly spaced relation.

Second, to provide a structure of this type which is easily installed and which is very simple and inexpensive.

Third, to provide a piston ring assembly of the type described enabling the various parts thereof to be positioned relative to one another in practically any desired angular relationship, and in the most advantageous locations on the assembly as a whole.

Further objects relating to details and economies of my invention will appear from the description to follow. The invention is defined in the claims.

A structure embodying the features of my invention is illustrated in the accompanying drawing, wherein:

Fig. 1 is an enlarged fragmentary plan view illustrating a piston ring assembly in accordance with my invention in operative, installed position relative to a piston and cylinder, which are conventionally shown in section.

Fig. 2 is an enlarged fragmentary perspective view illustrating the features of my invention in a preferred embodiment thereof, and Fig. 3 is an enlarged fragmentary view in section on line 3—3 of Fig. 2.

It is generally conceded by those skilled in the art relating to the manufacture of piston rings that improved performance results from maintaining a certain angularly spaced relationship between the cylinder wall engaging elements of certain types of multiple part piston rings. Assemblies heretofore produced with this general end in mind have, however, for the most part been difficult to install and in many cases objectionable because of danger to the ring assembly or cylinder wall or both if not installed with precision and extreme accuracy. In other proposed arrangements effective locking of the elements is secured only at the sacrifice of uniformity of the cylinder wall pressure exerted by the assembly.

The present invention corrects these difficulties while at the same time securing a multiple cylinder wall engaging element structure wherein the cylinder wall engaging elements are prevented from rotation relative to one another once they have inevitably assumed a predetermined desired angular relationship. In achieving this end I have adopted to some extent certain features shown in my copending application Serial No. 322,899, filed March 8, 1940.

Referring to the drawing the reference numeral 1 designates an internal combustion engine piston adapted to reciprocate in a cylinder 11 and provided with a groove for the reception of the piston ring assembly of my invention which is designated generally by the reference numeral 2. This assembly consists of upper and lower annular, thin, split, cylinder wall engaging elements 3 preferably of ribbon steel disposed for edge engagement with the cylinder wall and an intermediate spacer 4 which may be of cast-iron or other suitable material, and is, in the embodiment illustrated in Fig. 2, provided with ventilation notches or recesses 5 for use in an oil groove. The assembly is, to this extent, similar to that shown in my Patent No. 2,148,997 of February 28, 1939.

The foregoing assembly of parts is disposed in the piston groove and an inner crimped expanding spring 6, the axial dimension of which is approximately equal to the axial dimension of the assembly, is disposed radially internally of the latter for expanding engagement with the cylinder wall engaging elements or segments 3. These latter coact with the outwardly projecting, curved crimps 7 of the spring 6 in securing the objects of my invention.

The elements 3 are of a hard, tempered grade of steel possessed of substantial radial resilience or spring, however at the ends 8 thereof adjacent the ring gap they are annealed by heat treatment, as illustrated in Fig. 3, this treatment enabling the ends to be worked in the manner contemplated by my invention. Such working consists in the hammering, rolling or swedging the ends of the elements radially inwardly so as to form the projections 9, both ends having been shown as formed in this manner, although if desired only one thereof may be so worked within the contemplation of my invention.

The projections 9 are engageable with any desired one of the crimps 7 of the expanding spring 6 so as to effectively prevent angular movement of the element 3 on which they are formed and they perform this purpose without detracting from the action of the spring or unbalancing its effectiveness peripherally of the cylinder wall engaging element or elements.

Formation of the projections is accomplished with ease and speed and there are obviously no difficulties from the standpoint of installation. There is no necessity to locate and engage the various coacting interlocking means on the parts of the ring assembly and all that is necessary for the mechanic installing the assembly to do is to stagger the ends of the elements or sections of the assembly at approximately the relative positions recommended by the ring manufacturers. If the recommendations are followed there is no possibility of an installation in which an error exists sufficient to effect the uniformity of pressure of the wall engaging elements 3 or the assembly as a whole. As a matter of fact, if no pains at all are taken in installing the elements 3 no serious harm will result.

The present arrangement permits spacing and locating of an element of a multiple section ring at any desired point within the range of the angular spacing of the crimps of the inner expanding spring 6, within a negligible margin of error. In practically any installation the departure from true uniformity of spacing could not amount to over ⅛ to ½ of the total circumference.

It is, of course, important in the present invention that the notch or notches 9 do not decrease the radial dimensions of the elements at the point where the notch occurs. The elements have full cylinder wall engaging and sealing action except at the gap thereof. In my copending application Serial No. 322,899, referred to above, I explain at some length the advantage of annealing the ends of a tempered steel detent or section at or immediately adjacent the gap in the interests of uniform wearing of the ring element and application of force to the cylinder wall. Bearing this in mind, the ends of the present elements are desirably left in annealed form following formation of the projections 9 thereon, but if found desirable or advisable, they may be rehardened. The expander engaging portions of the projections 9 are preferably curved to coact with the curved crimps of the expanders. The foregoing structure is very effective indeed for its intended purpose, notwithstanding the extreme simplicity, inexpensiveness and fool-proof character thereof. It will be noted that this structure requires no special formation of the inner expanding spring which would add to the expense and bother of installation, likewise involving a possible chance for error in the event of careless installation. All that it is necessary to do in my structure is to slip the ring elements 3 in place in the approximate desired position relative to one another and to the spacer, whereupon, following initial operation of the assembly, they will assume the desired fixed, angular relation to one another. The independent radial action of the members is not interfered with or restricted in any manner.

An embodiment of the invention which incorporates the principles of the invention in a highly desirable manner has been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. In a piston ring assembly of the type described, a pair of thin, split, expansible, axially spaced cylinder wall engaging elements of tempered spring steel, and a crimped expanding spring disposed behind said elements for radial expanding engagement therewith, said elements being radially inwardly deformed adjacent the gap thereof to increase the radial dimension of the elements at this point and provide an internal projection, the elements being uniformly engageable with the cylinder wall throughout the periphery thereof including the point of increased radial dimension, said projections engaging a crimp of said expanding spring to prevent rotation of the element relative to said spring in the operation of the assembly.

2. In a piston ring assembly of the type described, a pair of thin, flat, split, annular, expansible cylinder wall engaging elements, crimped expanding means disposed behind said elements for radial expanding engagement therewith, said elements being radially inwardly deformed immediately adjacent the gap thereof to provide internal projections engageable with the crimps of said expanding means to prevent rotation of the element relative to said means in the operation of the assembly.

3. In a piston ring, a thin, annular, split, expansible, cylinder wall engaging element of tempered, ribbon steel adapted for edge engagement with a cylinder wall, said element having an end thereof adjacent to the gap thereof annealed and deformed inwardly to provide an internal radial projection of substantial size adapted for anchoring engagement with the crimp of an expanding spring, said end being of greater radial dimension than the part of the element immediately adjacent thereto for uniform engagement of the element with a cylinder wall throughout the circumference of the element.

HAROLD P. PHILLIPS.